(12) United States Patent
Coscia

(10) Patent No.: US 10,773,230 B2
(45) Date of Patent: Sep. 15, 2020

(54) REFORMER FOR PRODUCING SYNTHESIS GAS HAVING IMPROVED BURNER WASTE GAS FLOW

(71) Applicant: L'Air Liquide, Societe Anonyme pour l'Etude et l'Exploitation des Procedes Georges Claude, Paris (FR)

(72) Inventor: Antonio Coscia, Hadamar (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 103 days.

(21) Appl. No.: 15/765,884

(22) PCT Filed: Sep. 28, 2016

(86) PCT No.: PCT/EP2016/025104
§ 371 (c)(1),
(2) Date: Apr. 4, 2018

(87) PCT Pub. No.: WO2017/059962
PCT Pub. Date: Apr. 13, 2017

(65) Prior Publication Data
US 2018/0296998 A1 Oct. 18, 2018

(30) Foreign Application Priority Data
Oct. 5, 2015 (EP) ..................................... 15400044

(51) Int. Cl.
*B01J 8/06* (2006.01)
*C01B 3/38* (2006.01)

(52) U.S. Cl.
CPC .............. *B01J 8/062* (2013.01); *C01B 3/384* (2013.01); *C01B 2203/0233* (2013.01); *C01B 2203/0816* (2013.01)

(58) Field of Classification Search
CPC .. B01J 8/062; C01B 2203/0816; C01B 3/384; F23C 2900/03002; F23C 5/08
See application file for complete search history.

(56) References Cited

U.S. PATENT DOCUMENTS

| | | | | |
|---|---|---|---|---|
| 3,334,971 A | * | 8/1967 | Chevion | C01B 3/384 422/629 |
| 3,424,695 A | * | 1/1969 | Von Wiesenthal | C10G 9/20 48/127.9 |

(Continued)

FOREIGN PATENT DOCUMENTS

| DE | 25 216 83 | 12/1975 |
|---|---|---|
| DE | 195 12 219 | 4/1996 |

(Continued)

OTHER PUBLICATIONS

International Search Report and Written Opinion for PCT/EP2016/025104, dated Dec. 6, 2016.

*Primary Examiner* — Imran Akram
(74) *Attorney, Agent, or Firm* — Justin K. Murray

(57) ABSTRACT

A steam reformer, with a combustion chamber, catalyst tubes arranged in several rows, with burners for heating the catalyst tubes, with feed conduits each for supplying the catalyst tubes with educt gas and the burners with air and fuel gas, with collecting conduits for discharging the product gas, with channels for discharging the burner waste gases from the combustion chamber, wherein the ceilings of the channels each are formed by the bottom or the ceiling of the combustion chamber, and wherein the channels for discharging the burner waste gases are designed such that the flow velocity of the burner waste gases is constant along the entire length of the channels, as seen vertically to the catalyst tubes.

9 Claims, 4 Drawing Sheets

(56) References Cited

U.S. PATENT DOCUMENTS

| | | | | |
|---|---|---|---|---|
| 4,108,119 A * | 8/1978 | McWhorter | F02B 75/02 123/315 |
| 4,198,385 A * | 4/1980 | Feldbaumer | C01B 17/24 423/566 |
| 5,417,731 A * | 5/1995 | LeBlanc | C03B 5/235 65/134.4 |
| 6,098,614 A * | 8/2000 | Fleming | F24B 1/006 126/512 |
| 6,134,879 A * | 10/2000 | Frawley | B64D 33/04 239/127.3 |
| 6,844,637 B1 * | 1/2005 | Smith | H02K 9/005 310/54 |
| 2001/0017031 A1 * | 8/2001 | Sekiya | G01N 1/2252 60/324 |
| 2001/0039759 A1 * | 11/2001 | Sato | B01J 7/00 48/76 |
| 2004/0134127 A1 * | 7/2004 | Pham | C01B 3/384 48/198.7 |
| 2006/0057517 A1 * | 3/2006 | Joshi | C03B 5/235 431/12 |
| 2006/0277828 A1 * | 12/2006 | Licht | C01B 3/384 48/198.7 |
| 2007/0099141 A1 * | 5/2007 | Joshi | B01J 8/062 431/354 |
| 2007/0234974 A1 | 10/2007 | Tacker | |
| 2010/0126908 A1 * | 5/2010 | Giroudiere | B01J 8/067 208/133 |
| 2011/0220847 A1 * | 9/2011 | Hendershot | F23C 5/08 252/373 |
| 2012/0126177 A1 * | 5/2012 | Meissner | B01J 8/062 252/373 |
| 2014/0314631 A1 * | 10/2014 | Meissner | B01J 8/062 422/162 |
| 2015/0217250 A1 * | 8/2015 | Cances | B01J 8/067 252/373 |
| 2015/0239736 A1 * | 8/2015 | Martin | C01B 3/384 252/373 |
| 2016/0282052 A1 * | 9/2016 | Vernon | F28D 7/103 |

FOREIGN PATENT DOCUMENTS

| | | |
|---|---|---|
| DE | 102011120938 | 6/2013 |
| EP | 0 814 055 | 12/1997 |
| EP | 2 708 812 | 3/2014 |
| WO | WO 2010 149 361 | 12/2010 |
| WO | WO 2013/087194 | 6/2013 |

* cited by examiner

US 10,773,230 B2

REFORMER FOR PRODUCING SYNTHESIS GAS HAVING IMPROVED BURNER WASTE GAS FLOW

CROSS REFERENCE TO RELATED APPLICATIONS

This application is a § 371 of International PCT Application PCT/EP2016/025104, filed Sep. 28, 2016, which claims the benefit of EP1500044.2, filed Oct. 5, 2015, both of which are herein incorporated by reference in their entireties.

FIELD OF THE INVENTION

This invention relates to a steam reformer, comprising:
a combustion chamber with a bottom, a ceiling and side walls terminating the combustion chamber,
catalyst tubes arranged in several rows, which penetrate the bottom and/or the ceiling of the combustion chamber,
burners arranged in the ceiling, the bottom or one or more side walls of the combustion chamber for heating the catalyst tubes,
feed conduits extending below the bottom or above the ceiling of the combustion chamber each for supplying the catalyst tubes with educt gas and the burners with air and fuel gas,
collecting conduits extending below the bottom or above the ceiling of the combustion chamber for discharging the product gas,
channels extending below the bottom or above the ceiling of the combustion chamber for discharging the burner waste gases from the combustion chamber, wherein the ceilings of the channels each are formed by the bottom or the ceiling of the combustion chamber, wherein the channels are arranged along and between the rows of the catalyst tubes, and wherein the ceilings of the channels include openings for the passage of the waste gases.

The invention furthermore relates to a process for the catalytic conversion of hydrocarbonaceous gas with steam into a synthesis gas containing hydrogen and carbon oxides.

BACKGROUND OF THE INVENTION

Steam reformers for the conversion of gaseous hydrocarbons with steam into synthesis gas chiefly consisting of carbon monoxide and hydrogen are known. The steam reformation process is described in principle, for example in Ullmann's Encyclopedia of Industrial Chemistry, Sixth Edition, Vol. 15, chapter "Gas Production", section 2.2. The different types of tubular reactors proven for this process are discussed in section 2.2.3 of the same chapter. There are shown tubular reactors in which the burners are installed in the roof or in the side walls of the reformer housing. It should be noted in addition that variants with burners installed in the bottom of the housing, with flames directed vertically upwards into the housing, also are possible, as is mentioned e.g. in the document DE 2521683 A1.

For the uniform heating of all reformer tubes filled with a catalyst fixed bed, which are disposed in the reformer housing, the design and the arrangement of the channels for discharging the burner waste gases from the housing is very important. As shown in FIG. 6 of the above-mentioned Ullmann section 2.2.3, a proven design of the reformers consists in arranging the burners in the housing roof and the waste gas collecting channels at the bottom of the housing. The burners and the channels, each one opposite the other, are disposed between the rows of the reformer tubes. From the document DE 102011120938 A1 it also is known that it is possible to arrange the waste gas collecting channels directly below the bottom of the reformer housing. The bottom of the reformer housing at the same time forms the cover of the channels. Through openings in the cover, the burner waste gas passes from the reformer housing into the waste gas collecting channels. Via a collecting conduit the ends of the channels are connected with an apparatus for sucking off the waste gas, such as a blower or a chimney. The flow resistance which the waste gas stream is subject to within each of the channels leads to a pressure loss from the beginning of a channel to the end of a channel. Furthermore, the waste gas quantity sucked off cumulatively increases along the length of the channels, as via additional openings in the longitudinal directions of the channels additional burner waste gases are discharged from the reformer housing. This results in non-uniform turbulences in the burner waste gas, which are distributed along the channel length or in the bottom region of the reformer housing, and hence to a non-uniform heating of the reformer tubes.

SUMMARY OF THE INVENTION

Therefore, it is the object of the invention to provide a steam reformer in which the described disadvantages are avoided when the burner waste gases are sucked off. This object is solved by a steam reformer according to the features of claim 1.

Steam Reformer According to an Embodiment of the Invention:

A steam reformer, comprising:
a combustion chamber with a bottom, a ceiling and side walls terminating the combustion chamber,
catalyst tubes arranged in several rows, which penetrate the bottom and/or the ceiling of the combustion chamber,
burners arranged in the ceiling, the bottom or one or more sidewalls of the combustion chamber for heating the catalyst tubes,
feed conduits extending below the bottom or above the ceiling of the combustion chamber each for supplying the catalyst tubes with educt gas and for supplying the burners with air and fuel gas,
collecting conduits extending below the bottom or above the ceiling of the combustion chamber for discharging the product gas,
channels extending below the bottom or above the ceiling of the combustion chamber for discharging the burner waste gases from the combustion chamber, wherein the ceilings or bottoms of the channels each are formed by the bottom or the ceiling of the combustion chamber, wherein the channels are arranged along and between the rows of the catalyst tubes, and wherein the ceilings of the channels include openings for the passage of the waste gases,
wherein
the channels for discharging the burner waste gases are designed such that the flow velocity of the burner waste gases is constant along the entire length of the channels, as seen vertically to the catalyst tubes.

By keeping the flow velocity constant along the length of the channel in accordance with the invention, the ratio between the dynamic and the static fraction of the pressure, according to the law of conservation of energy according to Bernoulli, likewise remains constant. On the other hand, would the flow velocity increase from the beginning of a channel towards the end of a channel, the static pressure fraction would decrease due to this increase of the dynamic pressure fraction and hence the static pressure difference between the interior spaces of the reformer housing and the channel would rise. This in turn would tend to lead to a stronger extraction of burner waste gas in this region of the channels, which would have to be countered with a reduction of the passage openings between housing and channel.

Embodiments of the invention furthermore can further include a process for the catalytic conversion of hydrocarbonaceous gas with steam into a synthesis gas containing hydrogen and carbon oxides, comprising the following process steps:

providing a hydrocarbonaceous gas and steam,
producing an educt gas by mixing the gas and the steam,
converting the educt gas into a synthesis gas comprising hydrogen and carbon oxides by conversion in a steam reformer according to any of claims 1 to 6 under reforming conditions,
discharging the synthesis gas for the further treatment outside the process.

Reforming conditions are understood to be the operating conditions of the reformer plant well known to the skilled person, which ensure a technically and economically expedient degree of conversion of the feedstocks to synthesis gas components. A set of operating conditions chosen therefor also is referred to as operating point.

PREFERRED ASPECTS OF THE INVENTION

A preferred aspect of the invention is characterized in that the channels have a wedge-shaped longitudinal profile flared in flow direction from their beginning towards their end. This aspect takes account of the waste gas quantity increasing cumulatively along the length of the waste gas channels.

It furthermore is preferred when the openings in the channel ceilings each are continuous along the entire channel length and have a wedge profile tapering in flow direction. The pressure loss thereby increases along the length of the waste gas channels upon passage of the burner waste gases from the combustion chamber into the channels, so that the burner waste gases can be sucked off more easily from the rear part of the waste gas channels facing away from the suction device.

The two aforementioned preferred aspects advantageously can be combined, as in this way the change of the channel cross-section and the change of the size of the openings in the channel ceilings between reformer housing and channel are made continuously and without any jumps, which is beneficial for the uniformization of the waste gas flow of the burner waste gas out of the reformer housing. Unilateral mechanical loads of the waste gas channels or the combustion chamber as well as the non-uniform heating of the reformer tubes caused by turbulences thus are reduced.

In a further preferred aspect of the invention the openings in the channel ceilings are covered by gratings. In this way, a coherent opening is formed, which is not interrupted by closed points. This contributes positively to the further uniformization of the waste gas flow.

A further preferred aspect of the invention is characterized in that the ceilings of the channels each consist of a plurality of plates extending across the entire width of the channel, wherein openings are formed in the channel ceilings in that the plates are placed at distances to each other. In this way, the width of the channel opening is maintained along the entire channel length. The construction and the design of the channels thereby are simplified. The size of the passage openings can be varied in a simple way by exchanging and/or shifting the plates.

A further preferred aspect of the invention is characterized in that the distances of the plates to each other continuously become smaller in flow direction of the waste gas. As the static pressure in the channel decreases in flow direction due to the frictional resistance exerted on the gas flow by the channel walls, the extraction of the burner waste gas from the reformer housing is rendered more uniform along the channel length.

BRIEF DESCRIPTION OF THE DRAWINGS

Further features, advantages and possible applications of the invention can also be taken from the following description of exemplary embodiments and the drawings. All features described and/or illustrated form the subject-matter of the invention per se or in any combination, independent of their inclusion in the claims or their back-reference.

With reference to the drawing, an exemplary embodiment of the invention will be explained. In the drawing.

DETAILED DESCRIPTION OF THE INVENTION

Figure 1:
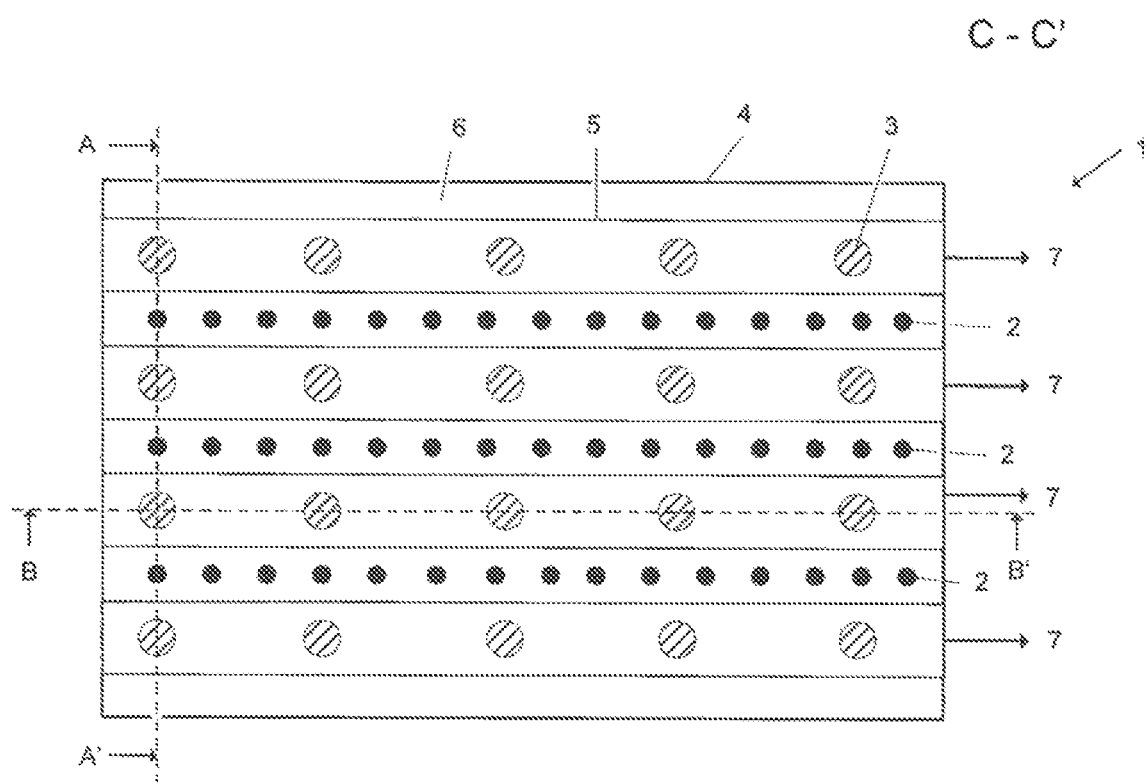
FIG. 1, C-C' shows a sectional drawing of the steam reformer, as seen from above, FIG. 2, A-A' shows a sectional drawing of the steam reformer, as seen from the front, FIG. 3, B-B' shows a sectional drawing of the steam reformer, as seen from the long side.

FIG. 1 shows a steam reformer 1 with reformer tubes 2 arranged in three parallel rows. Parallel to the reformer tube rows the burners 3 are arranged in four rows in the roof of the steam reformer housing 4. Opposite the burner rows one channel 5 each is installed below the bottom 6 of the reformer housing 4 for discharging the burner waste gas. The upper boundary, i.e. the cover 11 of the channel 5, at the same time forms a part of the bottom 6 of the reformer housing 4. FIG. 1 does not show the openings for the passage of the burner waste gases in the covers. The arrows 7 indicate the flow direction of the burner waste gas. When the burner waste gas exits at the end of the channel 5, it is taken over by a non-illustrated waste gas collection system which comprises a suction device.

Figure 2:
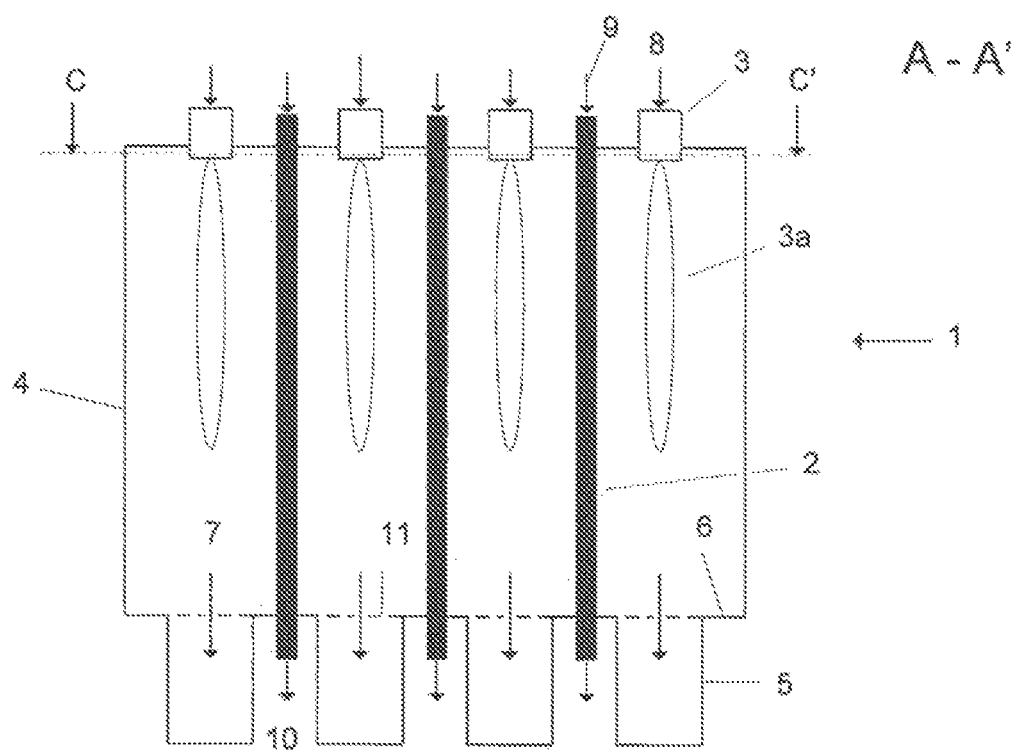

FIG. 2 shows the steam reformer 1 as seen from the front. The arrows 8 represent the fuel gas supply to the burners 3. The flames of the burners 3a are directed vertically into the reformer housing 4. The arrows 9 represent the educt gas supply to the reformer tubes 2, and the arrows 10 represent the discharge of product gas from the reformer tubes 2. Through the reformer bottom 6, the burner waste gas 7 passes through apertures in the channel cover 11, here symbolized by a broken line, into the waste gas channels 5.

Figure 3:
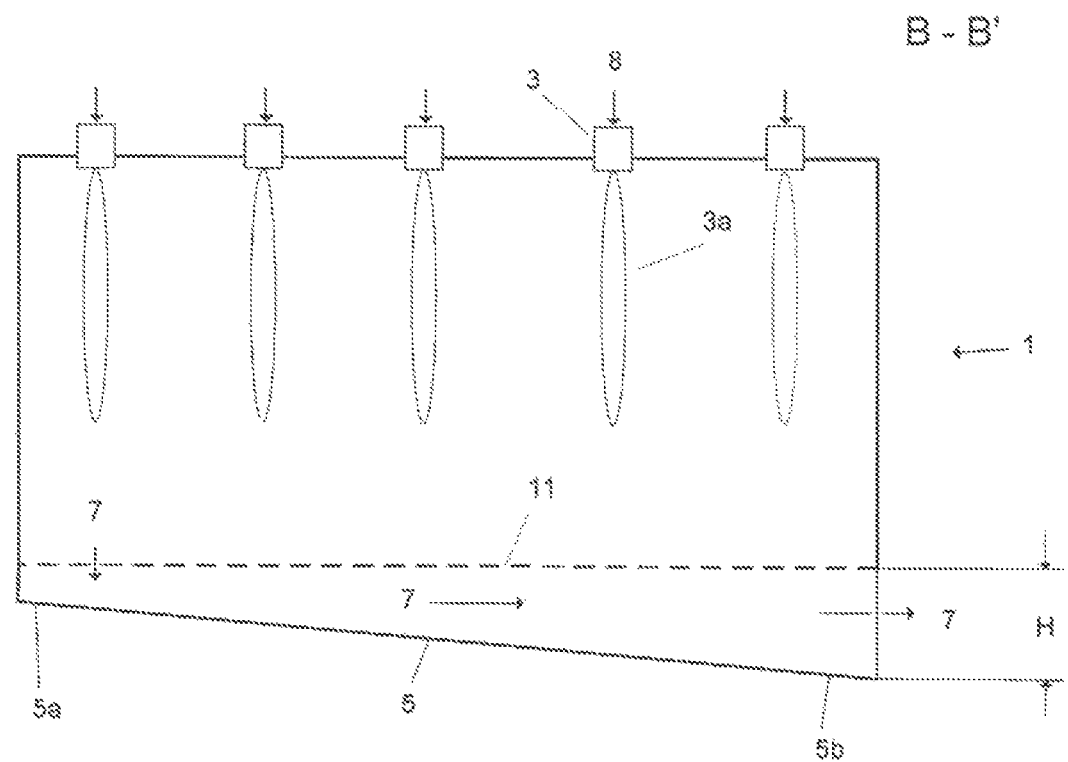

FIG. 3 shows the steam reformer 1 as seen from the long side. In this Figure it is indicated how the height H, and hence the cross-section, of the channel 5 increases from the beginning 5a of the channel to the end 5b of the channel in accordance with the invention.

Figure 4:
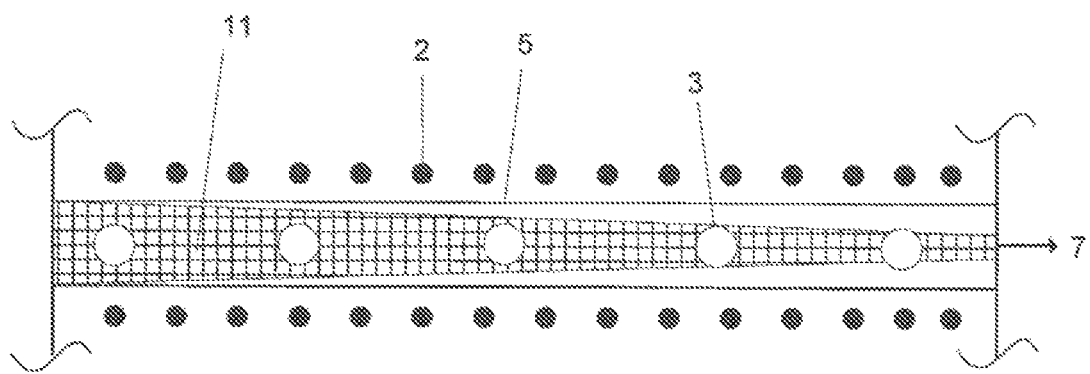
FIG. 4 shows a waste gas channel with wedge-shaped opening to the reformer housing.

FIG. 4 corresponds to a section of FIG. 1 and shows a burner waste gas channel 6 located between two rows of reformer tubes 2. The opening of the channel cover 11 is covered with a grating, and the shape of the opening has a wedge profile continuous along the entire channel length and tapering in flow direction.

Figure 5:
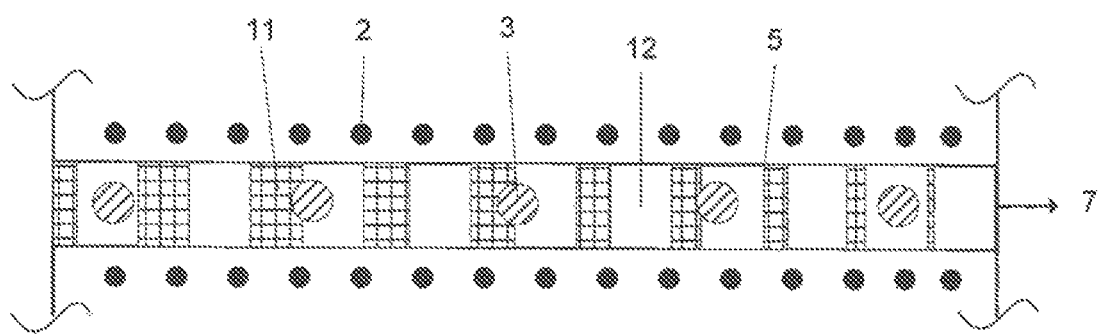
FIG. 5 shows a waste gas channel whose opening to the reformer housing is covered with plates.

FIG. 5 likewise corresponds to a section of FIG. 1 and likewise shows a burner waste gas channel 6 located between two rows of reformer tubes 2. In this case, the ceiling of the channel consists of a plurality of plates 12 extending across the entire width of the channel, which are placed at distances to each other on the channel ceiling covered with a grating, namely such that the distances between the plates, and hence the openings in the channel ceiling, continuously become smaller from the beginning of the channel towards the end of the channel, i.e. in flow direction of the burner waste gases.

INDUSTRIAL APPLICABILITY

The invention serves to improve the uniformity of the heating of a steam reformer. The economy of the reformer operation is increased thereby. The invention therefore is industrially applicable.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS

1 steam reformer
2 reformer tube
3 burner
4 reformer housing
5 waste gas channel for discharging burner waste gas
5*a* beginning of the waste gas channel
5*b* end of the waste gas channel
6 bottom of the reformer housing
7 burner waste gases
8 fuel gas
9 educt gas
10 product gas
11 gas-permeable cover for waste gas channel, part of the reformer housing bottom
12 plates for locally covering 11

The invention claimed is:

1. A steam reformer comprising:
   a combustion chamber with a bottom, a ceiling and side walls terminating the combustion chamber;
   catalyst tubes arranged in several rows, which penetrate the bottom and/or the ceiling of the combustion chamber;
   burners arranged in the ceiling, the bottom or one or more side walls of the combustion chamber for heating the catalyst tubes;
   feed conduits extending below the bottom or above the ceiling of the combustion chamber each for supplying the catalyst tubes with educt gas and for supplying the burners with air and fuel gas;
   collecting conduits extending below the bottom or above the ceiling of the combustion chamber for discharging the product gas; and
   channels extending below the bottom or above the ceiling of the combustion chamber for discharging the burner waste gases from the combustion chamber, wherein the ceilings or bottoms of the channels each are formed by the bottom or the ceiling of the combustion chamber, wherein the channels are arranged along and between the rows of the catalyst tubes, and wherein the ceilings or the bottoms of the channels include openings for the passage of the waste gases,
   wherein the channels for discharging the burner waste gases are configured such that the flow velocity of the burner waste gases is constant along the entire length of the channels, as seen vertically to the catalyst tubes, wherein said configuration is selected from the group consisting of a change of the channel cross-sectional area along the length of the channel, a change of the size of the openings between the reformer housing and the channel along the length of the channel, and combinations thereof.

2. The steam reformer according to claim 1, wherein the change of the channel cross-sectional area along the length of the channel comprises the channels having a wedge-shaped longitudinal profile flared in flow direction from their beginning towards their end.

3. The steam reformer according to claim 1, wherein the openings in the channel ceilings are covered by gratings.

4. A steam reformer comprising:
   a combustion chamber with a bottom, a ceiling and side walls terminating the combustion chamber;
   catalyst tubes arranged in several rows, which penetrate the bottom and/or the ceiling of the combustion chamber;
   burners arranged in the ceiling, the bottom or one or more side walls of the combustion chamber for heating the catalyst tubes;
   feed conduits extending below the bottom or above the ceiling of the combustion chamber each for supplying the catalyst tubes with educt gas and for supplying the burners with air and fuel gas;

collecting conduits extending below the bottom or above the ceiling of the combustion chamber for discharging the product gas; and channels extending below the bottom or above the ceiling of the combustion chamber for discharging the burner waste gases from the combustion chamber, wherein the ceilings or bottoms of the channels each are formed by the bottom or the ceiling of the combustion chamber, wherein the channels are arranged along and between the rows of the catalyst tubes, and wherein the ceilings or the bottoms of the channels include openings for the passage of the waste gases, wherein the channels for discharging the burner waste gases are configured such that the flow velocity of the burner waste gases is constant along the entire length of the channels, as seen vertically to the catalyst tubes, wherein the openings in the channel ceilings each are continuous along the entire channel length and have a wedge profile tapering in flow direction.

5. A steam reformer comprising:

a combustion chamber with a bottom, a ceiling and side walls terminating the combustion chamber;

catalyst tubes arranged in several rows, which penetrate the bottom and/or the ceiling of the combustion chamber;

burners arranged in the ceiling, the bottom or one or more side walls of the combustion chamber for heating the catalyst tubes;

feed conduits extending below the bottom or above the ceiling of the combustion chamber each for supplying the catalyst tubes with educt gas and for supplying the burners with air and fuel gas;

collecting conduits extending below the bottom or above the ceiling of the combustion chamber for discharging the product gas; and channels extending below the bottom or above the ceiling of the combustion chamber for discharging the burner waste gases from the combustion chamber, wherein the ceilings or bottoms of the channels each are formed by the bottom or the ceiling of the combustion chamber, wherein the channels are arranged along and between the rows of the catalyst tubes, and wherein the ceilings or the bottoms of the channels include openings for the passage of the waste gases, wherein the channels for discharging the burner waste gases are configured such that the flow velocity of the burner waste gases is constant along the entire length of the channels, as seen vertically to the catalyst tubes wherein the ceilings of the channels each consist of a plurality of plates extending across the entire width of the channel, wherein openings are formed in the channel ceilings in that the plates are placed at distances to each other.

6. The steam reformer according to claim 5, wherein the openings in the channel ceilings continuously become smaller in flow direction.

7. A steam reformer comprising:

a combustion chamber with a bottom, a ceiling and side walls terminating the combustion chamber;

catalyst tubes arranged in several rows, which penetrate the bottom and/or the ceiling of the combustion chamber;

burners arranged in the ceiling, the bottom or one or more side walls of the combustion chamber for heating the catalyst tubes;

feed conduits extending below the bottom or above the ceiling of the combustion chamber each for supplying the catalyst tubes with educt gas and for supplying the burners with air and fuel gas;

collecting conduits extending below the bottom or above the ceiling of the combustion chamber for discharging the product gas;

channels extending below the bottom or above the ceiling of the combustion chamber for discharging the burner waste gases from the combustion chamber, wherein the ceilings or bottoms of the channels each are formed by the bottom or the ceiling of the combustion chamber, wherein the channels are arranged along and between the rows of the catalyst tubes, and wherein the ceilings or the bottoms of the channels include openings for the passage of the waste gases, wherein the channels for discharging the burner waste gases employ means for maintaining flow velocity of the burner waste gases constant along the entire length of the channels, as seen vertically to the catalyst tubes.

8. The steam reformer as claimed in claim 7 wherein the means for maintaining flow velocity of the burner waste gases is selected from the group consisting of means for accounting for increased burner waste gas accumulation along the length of the waste gas channels, means for increasing the pressure loss across the channel ceilings along the length of the waste gas channels, and combinations thereof.

9. A process for the catalytic conversion of hydrocarbonaceous gas with steam into a synthesis gas containing hydrogen and carbon oxides, comprising the following process steps:

providing the steam reformer selected from the group consisting of steam reformers claimed in claims 1, 4, 5, and 7;

providing a hydrocarbonaceous gas and steam;

producing an educt gas by mixing the gas and the steam;

converting the educt gas into a synthesis gas comprising hydrogen and carbon oxides by conversion in the steam reformer under reforming conditions; and discharging the synthesis gas for the further treatment outside the process.

* * * * *